United States Patent [19]

Patterson

[11] Patent Number: 5,234,026

[45] Date of Patent: Aug. 10, 1993

[54] PRESSURE REDUCING REGULATOR

[75] Inventor: Daryll D. Patterson, Brooklyn Park, Minn.

[73] Assignee: Tescom Corporation, Elk River, Minn.

[21] Appl. No.: 905,360

[22] Filed: Jun. 29, 1992

[51] Int. Cl.[5] .............................................. G05D 16/04
[52] U.S. Cl. ............................... 137/505.18; 137/375; 137/505.42; 251/86
[58] Field of Search ................... 137/505.39, 505.42, 137/505.18; 251/86

[56] References Cited

U.S. PATENT DOCUMENTS

| 298,687 | 5/1884 | Gooding . | |
|---|---|---|---|
| 2,660,834 | 12/1953 | MacGlashan, Jr. . | |
| 3,474,822 | 10/1969 | Kuhn et al. | 251/86 X |
| 3,812,877 | 5/1974 | Fleishhacker et al. | 137/505.42 |
| 3,906,982 | 9/1975 | Fleischhacker et al. | 137/505.11 |
| 3,911,947 | 10/1975 | Boxall | 137/505.14 |
| 4,257,450 | 3/1981 | Ollivier | 137/505.42 |
| 4,693,267 | 9/1987 | Patterson | 137/505.42 X |
| 5,033,505 | 7/1991 | Eidsmore | 137/505.39 |

Primary Examiner—Stephen M. Hepperle
Attorney, Agent, or Firm—Clayton R. Johnson

[57] ABSTRACT

The pressure reducing regulator includes a balanced valve arrangement, a sensor being resiliently urged toward a valve seat. A sensor insert is mounted by the sensor for axial movement therewith, the insert mounting the valve stem for movement therewtih between an open and a closed position and limited swivel movement relative thereto to form a more positive fluid seal with the valve seat. The valve stem extends through the valve seat. When the pressure decreases in the variable pressure chamber that is axially between the valve seat and the sensor, the sensor, and accordingly the valve stem is resiliently moved to its open position to allow fluid flow thereinto from the regulator inlet. A relatively weak spring and the inlet pressure in the pressure chamber act to result in the valve stem being moved to its closed position against the above mentioned resilient urging when the outlet pressure is at its desired level.

9 Claims, 2 Drawing Sheets

PRESSURE REDUCING REGULATOR

BACKGROUND OF THE INVENTION

A pressure reducing regulator that is especially adapted for use in compressed natural gas engine systems.

In U.S. Pat. No. 298,687 there is disclosed a regulator having a valve head mounted to a valve rod axially intermediate portion for moving upwardly to block fluid flow upwardly through a valve seat, an upwardly opening cup shaped piston head connected to the lower end of the valve rod, a downwardly opening cup shaped piston connected to the upper end of the valve rod and a spring abutting against the downwardly opening piston to urge the downwardly opening piston and the valve rod downwardly. An axial passage extends through the valve rod to open to the ambient atmosphere below the piston head and to the chamber between the upper piston head and the valve cap that closes the upper end of the regulator bore, it being optional to provide an opening in the valve cap.

The pressure regulator of U.S. Pat. No. 2,660,934 includes a plunger axially movable in a valve member bore and having an enlarged diameter piston portion in fluid sealing relationship with the wall of the bore to in combination with said wall and the valve seat form a variable volume pressure chamber having the regulator outlet opening thereto, a valve stem portion depending from the enlarged piston to extend through the pressure chamber and the valve seat passage, and a smaller diameter piston for blocking fluid flow from the inlet to the valve seat passage when the plunger is in its valve seated closed position, and a counterbalance spring for urging the plunger to a valve seat open position.

U.S. Pat. No. 3,906,982 discloses a regulator having a valve body mounting a diaphragm to in combination therewith and a valve seat form a variable volume pressure chamber having the outlet opening thereto, a spring resiliently urging the central portion of the diaphragm toward the valve seat, and a valve stem assembly having a plunger that is movable to block fluid flow from the inlet to the valve seat passage and a valve rod connected to the plunger and extended through the valve seat passage and variable chamber to abut against a ball which is mounted by the central portion of the diaphragm.

The pressure regulator of U.S. Pat. No. 3,911,947 includes a manually adjustable spindle threadedly mounted in the top of the valve housing, a lower enlarged diameter button on the spindle being rotatable relative to the plunger by being located in the generally T-shaped opening in the plunger while axially adjusting the plunger.

In order to make improvements in pressure regulators and particularly to adapt such regulators for use in vehicles that utilize compressed natural gas engines, this invention has been made.

SUMMARY OF THE INVENTION

The main body of the pressure reducing regulator is surrounded by a hot water jacket to eliminate "freeze up" during use while a balanced main valve arrangement is provided in the valve bore to minimize decaying inlet pressure effects. A combination of a sensor and sensor insert form a piston in a valve bore, the upper head portion of a valve stem being extended into a slot of the insert to move axially therewith and permitting limited swivel movement of the stem for blocking fluid flow through the valve seat bore. A spring urges the sensor downwardly while fluid pressure in the pressure chamber acts on the sensor and a weaker spring acts to move the valve stem member upwardly to block fluid flow upwardly through the valve seat. The above provides positive fluid flow blockage and decreases the chance of leakage.

One of the objects of this invention is to provide new and novel valving mechanism in a pressure regulator to insure positive shutoff and prevent main valve leakage. An additional object of the invention is to provide new and novel sensor mechanism in a pressure regulator for protecting against regulator failure.

Figure 1:
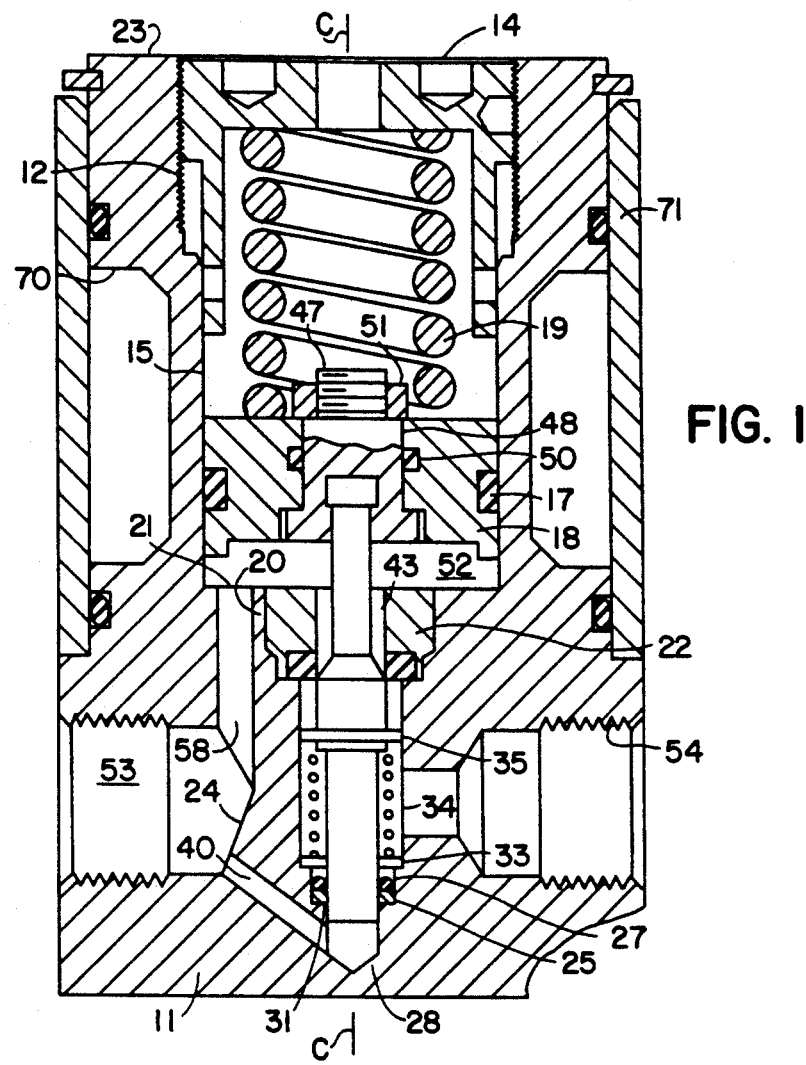
FIG. 1 is a vertical cross sectional view of the regulator apparatus of this invention.
Figure 6:
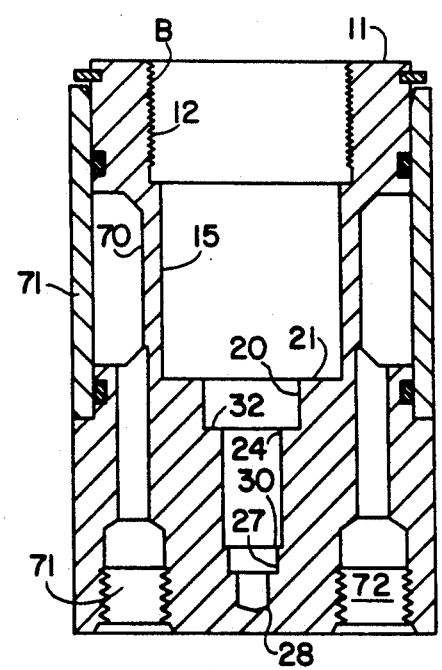
FIG. 6 is a vertical cross sectional view of the valve body and the water jacket that is taken angularly offset from the showing of FIG. 1 in order to show the inlet and outlet to the water jacket and to more clearly show the configuration of the valve bore.

The regulator apparatus includes a main body 11 that has a top surface 23 and has an axially elongated bore B that includes a top bore portion 12 with a dome 14 adjustably threaded therein for closing the upper end of the bore, other than for the central opening in the dome. Bore portion 12 opens to the top of a sensor bore portion 15 that is of a smaller diameter and has a sensor 18 axially movable therein with a fluid seal (resilient ring in a sensor groove) 17 radially between the sensor and the bore wall. A coil spring 19 at one end seats against the dome and at the opposite end seats against the sensor to resiliently urge the sensor axially toward the valve seat 22 and away from the dome.

The bore portion 15 opens to the threaded valve seat bore portion 20 that is of a further reduced diameter to form an annular, upwardly facing shoulder 21. Bore portion 20 at its lower end opens to a still further reduced diameter spring containing bore portion 24 to form a shoulder 32 which limits the axial threaded movement of the valve seat 22 away from the dome and against which the valve seat abuts. Bore portion 24 opens to a further reduced diameter guide mounting bore portion 27 to form an annular shoulder 30, bore portion 27 in turn opening to the bottom portion 28 and forming an annular shoulder 31. Annular valve stem guides, including an O-ring, 25 are mounted in bore portion 27 in abutting relationship to the shoulder 31 to limit the downward movement thereof while form a close sliding fit with portion 33 to block significant fluid flow from bore portion 27 to the bore portion 28.

Figure 4:
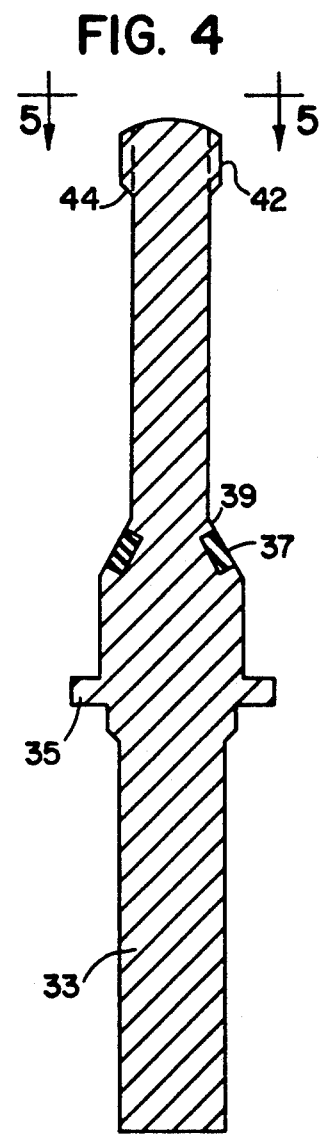
FIG. 4 is an enlarged vertical cross sectional view of the valve stem.
Figure 5:
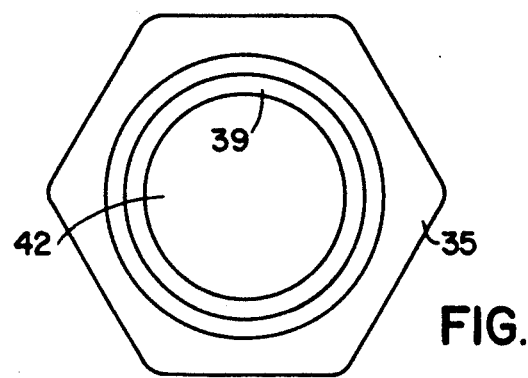
FIG. 5 is a top view of the valve stem that is taken along the line and in the direction of the arrows 5—5 of FIG. 4.

The valve stem V, see FIGS. 1 and 4, has an axially elongated tubular portion 33 extending within bore portions 24, 27, 28 and is axially movable within the stem guides 25 which abut against the shoulder 31. A valve stem hex portion 35 is joined to the upper end of the tubular portion 33 to permit axial bypass flow within the bore portion 24 radially between the edges of the hex portion and the main body wall defining bore portion 24, the minimum diametric dimension of the hex portion being substantially greater than that of the maximum outer diameter of the tubular portion. A coil spring 34 surrounds the tubular portion 33 and has one end bearing against the valve guides and an opposite end bearing against the hex portion to resiliently urge the valve stem toward the dome. It is noted that spring 34 is a much weaker spring than spring 19. A larger diameter tubular portion 38 at its lower end is joined to the hex portion and at its upper end is joined to the major base of the frustoconical portion 39. Advantageously a fluid seal member 37 is provided in a groove in the frustoconical portion for abutting against the valve seat 22 when the valve stem is in its closed position. A fluid passageway 40 is provided in the body 11 to open to the lower end of the bore 28 and at the opposite end to one of the valve outlet 53 and the passageway 58.

The valve stem also includes a rod (stem) portion 41 of the same diameter as that of the minor base of the frustoconical portion and joined thereto. The rod portion upper end is joined to a larger diameter head portion 42 to form a downwardly facing shoulder 44. The rod portion is of a smaller diameter than that of the valve seat bore (passage) 43 to provide an axially extending, annular clearance space therewith and is axially movably extended through the valve seat. At least the lower part of the passage 43 is of a sufficiently smaller diameter than that of the major base of the frustoconical portion 39 such that in the closed position, the frustoconical portion forms a fluid seal with the valve seat.

Figure 3:
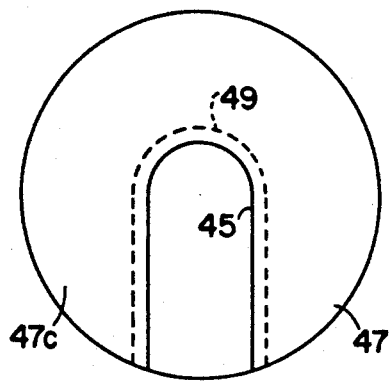
FIG. 3 is a bottom view of the sensor insert that is generally taken along the line and in the direction of the arrows 3—3 of FIG. Z.
Figure 2:
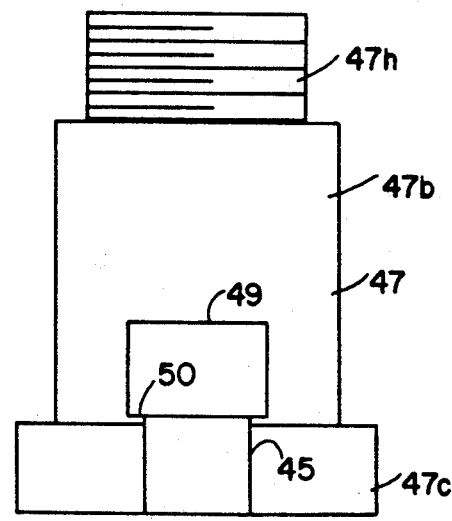
FIG. 2 is an enlarged side view of the sensor insert that is looking directly toward the opening of the valve stem slot through the sensor circumferential side.

A slot 45 that is generally U-shaped in transverse cross section is provided in the lower enlarged diametric portion 47c of the sensor insert 47 to open through the outer peripheral wall of portion 47c of the insert and axially downwardly through the bottom surface of the insert. The slot 45 opens axially upwardly to a valve stem head slot 49 formed in the upper portion of the sensor insert and is generally U-shaped in transverse cross section to form an upwardly facing, generally U-shaped, transverse shoulder 50 for having the valve stem shoulder 44 seated thereon to block downward and upward movement of the valve stem independent of the sensor insert. As may be seen from FIG. 3, each of the slots 45, 49 are transversely elongated with the minimum transverse dimension of the slot 45 that is at right angles to the direction of elongation being significantly less than the corresponding dimension of the slot 49. The diameter of the head portion 42 is greater than the above mentioned minimum dimension of the slot 45 but less than the corresponding minimum dimension of the slot 49. When the insert is in the sensor bore 48, the circumferential wall defining the sensor bore prevents the head portion moving out of the U-shaped slots.

The web portion surfaces of each of the slots 45, 49 are circumferentially curved about the central axis C—C of the valve bore, the radius of curvature of the web portion of slot 49 being greater than the radius of curvature of the head portion 42, and the radius of curvature of the web portion of slot 45 being greater than that of the tubular portion 41, but less than that of the head portion 42. Thus, the sensor insert is provided with the slot 49 for having the head of the valve stem radially moved thereinto such that the central axis of the valve stem can aligned with the central axis of the bore V; and alternately the valve stem can swivel in the slots a limited amount to block fluid flow through the valve seat bore if necessary.

The insert is mounted by the sensor 18 to move axially therewith, the insert extending within the sensor bore 48. The sensor bore has a lower enlarged diametric portion to form a downwardly facing shoulder abuttable against the insert shoulder 57 for moving the insert downwardly with the sensor and blocking upward axial movement of the insert relative to the sensor. A nut 51 is threaded on the upper end portion 47h of the insert and bears against the top surface of the sensor to block the downward movement of the insert relative to the sensor. A seal member (resilient ring in an annular groove) 50 provides a fluid seal between the insert and the sensor.

The combination of the senor 18 and senor insert 47 form a piston; the piston, valve seat and main body cooperatively forming a variable volume pressure chamber 52. The chamber is continuously in fluid communication with the lower bore portion 28 regardless of whether the valve stem is in a valve open or closed position in that in the valve stem closed position, the passageway 40 opening to one of the chamber 52, passageway 58 and outlet 53 downstream of the location that the frustoconical portion of the valve stem abuts against the valve seat lower portion. Accordingly there is provided a main valve balance pressure feature. That is, there is a provision for pressure at lower terminal end of the valve stem with that in the pressure chamber reaching equilibrium even when the valve stem is in its closed position.

The main body 11 has a pressurized gas inlet port 54 that opens to bore portion 24, and an outlet passageway 58 that at one end opens to the gas outlet 53 and at the opposite end to the pressure chamber 52. When the fluid pressure in the chamber 52 decreases below a preselected value, the piston axially moves toward the valve seat and therethrough moves the valve stem frustoconical portion downwardly away from the valve seat to permit fluid flow from the inlet port to the chamber 52. AS the pressure in chamber 52 increases, the piston moves away from the valve seat, and after the pressure in chamber 52 has sufficiently increased (has risen to the preselected value), the piston moves upwardly against the resilient action of spring 19 to pull the valve stem to its closed condition to block fluid flow from the gas inlet to the pressure chamber. Even if the radial outer, lower annular flange of the sensor is in abutting relationship to the shoulder 21, the pressure chamber still provides a fluid flow path from the valve seat bore to the passageway 58.

Due to the provision of the insert slot, the valve stem can move a limited amount (swivel movement) relative to the insert so that the frustoconical valve stem portion can form a good fluid seal with the valve seat when the valve seat is in its valve closed position even though the central axis of the insert bore is not quite coextensive with the valve stem when the valve stem is in its valve open position.

In order to prevent undue cooling ("freezeup") of the regulator, advantageously the main body 11 is provided with an annular groove 70 that in combination with a sleeve 71 forms an annular water chamber (water jacket) surrounding bore portion 15 and a water inlet 71 and a water outlet 72 that open to the water chamber If the regulator is being used on a vehicle, advantageously the water (cooling fluid) inlet and outlet are connected to the vehicle cooling system with the inlet 71 fluidly connected to the hot side of the system.

The regulator of this invention is particularly adapted for use in a natural gas system for powering vehicles. For such uses, a puncture or other leakage through a diaphragm of conventional regulators can result in a dangerous gas leakage condition whereas a piston is much stronger and more reliable. With reference thereto, desirably the sensor and sensor insert are made of metal. Also, by using the piston to pull the valve stem up to its closed position, in the event there is any leakage between the valve stem and the valve seat, the pressure in the chamber 52 would increase and thereby exert a greater force for moving the valve stem to its closed position. The features of having a piston in the regulator and the piston tied to the valve stem to pull the valve stem to its closed position when the pressure in the pressure chamber increases provides a more positive shut off. Additionally, with the balanced feature of the valve stem, there is a smaller change in outlet pressure as the inlet gas pressure decays, for example from the emptying of the tank that serves as the source of pressurized fluid for the regulator inlet.

Even though the rod portion 41 and head portion 44 are referred to as having a diameter or being diametric, it is to be understood that these members may have axial grooves extending the length thereof and the diameter will be considered the maximum transverse dimension thereof.

As an example, if the regulator of this invention is used in a vehicle natural gas system, it may be used as a first stage high pressure regulator with the inlet 54 fluidly connected to high pressure gas tanks (not shown) that serve as the fuel source and the outlet 53 fluidly connected through other system components (not shown) to the vehicle engine.

What is claimed is:

1. A pressure regulator assembly comprising a regulator main body having an axial bore, an inlet opening to the bore and an outlet opening to the bore, a valve seat in the bore axially intermediate the opening of the inlet and outlet to the bore and having a valve seat passage, a piston axially movable in the bore for, in combination with the main body and the valve seat, form a variable pressure chamber, said variable pressure chamber having the outlet and the valve seat passage opening thereto, the main body having a circumferential wall portion surrounding the piston, forming an axially part of said bore and a part of said variable pressure chamber, a valve member axially movable in the bore between a valve seat closed position blocking fluid flow therethrough and an opening position, and having a head portion, a second portion extending between the valve seat and inlet for abutting against the valve seat to block flow from the inlet and then through the valve seat passage to the pressure chamber and a stem portion extending through the valve seat passage and the pressure chamber and having one end connected to the heat portion and an opposite end connected to the valve member second portion, the piston having means for mounting the heat portion for limited swivel movement relative thereto and axially moving the valve member therewith as the piston moves toward and away from the valve seat, the valve member having an end portion more remote from the valve seat than the opening of the inlet to the bore, means forming a fluid seal between the valve member end portion and the main body, the main body having a fluid passageway that has one end opening to the bore more remote from the valve seat than the fluid seal means and an opposite end that opens to one of the pressure chamber and the outlet, and resilient means for constantly urging the piston toward the valve seat.

2. A pressure regulator assembly comprising a regulator main body having a top surface, an axial bore opening through the top surface, an inlet passage opening to the bore and an outlet passage opening to the bore, a valve seat in the bore axially intermediate the opening of the inlet and outlet passages to the bore and having a valve seat passage, the bore having a first bore portion, a second bore portion of a smaller diameter than the first bore portion to form a first annular upwardly facing shoulder, a third bore portion of a smaller diameter than the second bore portion to form a second annular upwardly facing shoulder and a fourth bore portion of a smaller diameter than the third bore portion to form a third annular upwardly facing shoulder, a piston axially movable in the first bore portion axially toward and away from the first shoulder to, in combination with the main body and the valve seat, form a variable pressure chamber having the outlet passage and the valve seat passage opening thereto, the valve seat being threadedly mounted by the second bore portion, the inlet opening to the third bore portion, a valve member axially movable in the bore between a valve seat closed position blocking fluid flow therethrough and an open position, and having a head portion, a second portion joined to the head portion and extending between the valve seat and inlet passage for abutting against the valve seat to block fluid flow from the inlet passage and then through through the valve seat passage to the pressure chamber, and a terminal end portion joined to the second portion and slidably extended in the fourth bore portion in each of the valve member open and fluid blocking positions, means for forming a close sliding fit with the valve member and blocking significant fluid flow between the third and fourth bore portions, relatively weak spring means in the bore for resiliently urging the valve member toward its fluid blocking position, the valve member having a fluid passage therein that has one end opening to the fourth bore portion and an opposite end that opens to one of the pressure chamber and the outlet passage, and relatively strong spring means in the bore for resiliently urging the piston toward the valve seat.

3. The apparatus of claim 2 further characterized in that the second portion includes a stem portion joined to the head portion and into the valve seat passage, and a frustoconical portion having a minor base joined to the stem portion axially opposite the piston and a major base of a larger transverse area than that of at least part of the transverse area of the valve seat passage and a diametric portion having one end joined to the major base and an opposite end joined to the terminal end portion, the valve member passage opposite end opening through the frustoconical portion axially intermediate the major and minor bases, and the diametric portion being of a transverse cross sectional area that is about the same as that of the major base and substantially larger than that of the corresponding cross sectional area of the terminal end portion.

4. The apparatus of claim 3 further characterized in that the piston has a bottom transverse surface axially adjacent to the valve seat, an annular sensor in axially slidable, fluidly sealing relationship with the main body, and a sensor insert axially removably mounted by the sensor to extend therein, the sensor insert having a first transversely elongated, generally U-shaped slotted section having the valve stem portion extended therethrough, opening to the sensor and of a minimum transverse dimension substantially smaller than the corresponding dimension of the head portion, said first slotted portion opening through the piston bottom surface and axially toward the valve seat, and a second transversely elongated, generally U-shaped slotted section having the head portion extended therein and opening to the first slotted section and to the sensor, the minimum transverse dimension of the second slotted portion at right angles to the direction of elongation of the second slotted portion being greater than the corresponding maximum dimension of the head portion.

5. A pressure regulator assembly comprising a regulator main body having an axial bore, an inlet opening to the bore and an outlet opening to the bore, a valve seat in the bore axially intermediate the opening of the inlet and outlet to the bore and having a valve seat passage, a piston axially movable in the bore for, in combination with the main body and the valve seat, form a variable pressure chamber, said variable pressure chamber having the outlet and the valve seat passage opening thereto, the piston having a transverse bottom surface axially adjacent to the valve seat, a valve member axially movable in the bore between a valve seat closed position blocking fluid flow therethrough and an open position, and having a head portion, a second portion extending between the valve seat and inlet for abutting against the valve seat to block fluid flow from the inlet and then through the valve seat passage to the pressure chamber and a stem portion extending through the valve seat passage and the pressure chamber and having one end connected to the head portion and an opposite end connected to the valve member second portion, said valving member second portion including a frustoconical portion extendable into the valve seat passage to block fluid flow from the inlet and through the valve seat passage to the pressure chamber and a first end portion remote from the piston and extending within the bore, the frustoconical portion having a minor base of a significantly smaller diameter than the valve seat passage and a major base more remote from the piston than the minor base and of a significant larger diameter than the diameter of the valve seat passage, and guide means in the bore more remote from the valve seat than the opening of the inlet to the bore for having the first end portion axially movably extended therethrough, the piston having means for mounting the head portion for limited swivel movement relative thereto and axially moving the valve member therewith as the piston moves toward and away from the valve seat and resilient means for constantly urging the piston toward the valve seat, the piston means comprising a first transversely elongated slotted section having the valve stem portion transversely movably extended therethrough and of a minimum transverse dimension that is smaller than the corresponding dimension of the head portion, said first slotted portion opening through the piston bottom surface and axially toward the valve seat, and a second transversely elongated slotted section having the head portion extended therein, the minimum transverse dimension of the second slotted portion at right angles to the direction of elongation of the second slotted portion being greater than the corresponding maximum dimension of the head portion, and the main body having a fluid passageway that at one end opens to the bore more remote from the valve seat than the guide means and the inlet, the guide means being axially intermediate the opening of the passageway to the bore and the inlet.

6. A pressure regulator assembly comprising a regulator main body having an axial bore, an inlet opening to the bore and an outlet opening to the bore, a valve seat in the bore axially intermediate the opening of the inlet and outlet to the bore and having a valve seat passage, a piston axially movable in the bore for, in combination with the main body and the valve seat, form a variable pressure chamber, said variable pressure chamber having the outlet and the valve seat passage opening thereto, the piston having a transverse surface axially adjacent to the valve seat, a valve member axially movable in the bore between a valve seat closed position blocking fluid flow therethrough and an open position, and having a head portion, a second portion extending between the valve seat and inlet for abutting against the valve seat to block fluid flow from the inlet and then through the valve seat passage to the pressure chamber and a stem portion extending through the valve seat passage and the pressure chamber and having one end connected to the head portion and an opposite end connected to the valve member second portion, said valving member second portion including a frustoconical portion extendable into the valve seat passage to block fluid flow from the inlet and through the valve seat passage to the pressure chamber and a first end portion remote from the piston and extending within the bore, the frustoconical portion having a minor base of a significantly smaller diameter than the valve seat passage and a major base more remote from the piston than the minor base and of a significant larger diameter than the diameter of the valve seat passage, and guide means in the bore more remote from the valve seat than the opening of the inlet to the bore for having the first end portion axially movably extended therethrough, the piston having means for mounting the head portion for limited swivel movement relative thereto and axially moving the valve member therewith as the piston moves toward and away from the valve seat and resilient means for constantly urging the piston toward the valve seat, the piston means comprising a first transversely elongated slotted section having the valve stem portion transversely movably extended therethrough and of a minimum transverse dimension that is smaller than the corresponding dimension of the head portion, said first slotted portion opening through the piston bottom surface and axially toward the valve seat, and a second transversely elongated slotted section having the head portion extended therein, the minimum transverse dimension of the second slotted portion at right angles to the direction of elongation of the second slotted portion being greater than the corresponding maximum dimension of the head portion.

7. The apparatus of claim 5 further characterized in that the piston comprises an annular sensor in axially slidable, fluidly sealing relationship with the main body, and a sensor insert removably mounted by the sensor to extend therein in fluid sealing relationship therewith, the sensor insert having the first and second slotted portions therein.

8. The apparatus of claim 7 further characterized in that the sensor insert has at least one axially extending circumferential outer surface, the slotted portions each being of a generally U-shaped and opening outwardly through the at least one circumferential outer surface, the sensor insert being mounted on the sensor in at least substantially fixed relationship relative thereto, 9. The apparatus of claim 4 further characterized in that the bore has a first bore portion axially remote from the valve seat and axially opposite the valve seat from each of the opening of the inlet to the bore and the piston and a second bore portion of a reduced diameter and opening to the first bore portion to form an annular shoulder, the second bore portion extending axially more remote from the valve seat than the first bore portion, that the valve member second portion has a terminal end portion slidably extended into the first and second bore portions, and that a guide member for the valve member is mounted in abutting relationship to the shoulder.

* * * * *